United States Patent (10) Patent No.: US 11,588,206 B2
He et al. (45) Date of Patent: Feb. 21, 2023

(54) PRESSURE BALANCING DEVICE

(71) Applicant: ILLINOIS TOOL WORKS INC., Glenview, IL (US)

(72) Inventors: Jiahui He, Shanghai (CN); Mengli Sun, Shanghai (CN)

(*) Notice: Subject to any disclaimer, the term of this patent is extended or adjusted under 35 U.S.C. 154(b) by 140 days.

(21) Appl. No.: 17/213,356

(22) Filed: Mar. 26, 2021

(65) Prior Publication Data

US 2021/0305656 A1 Sep. 30, 2021

(30) Foreign Application Priority Data

Mar. 30, 2020 (CN) .......................... 202010236508.7

(51) Int. Cl.
H01M 50/30 (2021.01)
H01M 50/308 (2021.01)

(52) U.S. Cl.
CPC ....... H01M 50/394 (2021.01); H01M 50/308 (2021.01)

(58) Field of Classification Search
None
See application file for complete search history.

(56) References Cited

U.S. PATENT DOCUMENTS

| 2014/0287282 A1* | 9/2014 | Beylich | H01M 50/20 |
| | | | 429/53 |
| 2016/0372726 A1* | 12/2016 | Baldwin | H01M 50/308 |
| 2017/0018748 A1* | 1/2017 | Matsuura | H01M 50/333 |

FOREIGN PATENT DOCUMENTS

DE 102012202103 A1 * 8/2013 ........... H05K 5/0213

OTHER PUBLICATIONS

Machine translation of DE-102012202103-A1. (Year: 2013).*

* cited by examiner

Primary Examiner — Gregg Cantelmo
(74) Attorney, Agent, or Firm — Quarles & Brady LLP

(57) ABSTRACT

A pressure balancing device comprises a mounting seat, a breathable film and a drying component. The mounting seat comprises a mounting seat housing and a support portion connected to the mounting seat housing. A fluid channel is formed in the mounting seat housing, the support portion is disposed in the fluid channel, and the fluid channel is capable of fluidly communicating an interior space of a component to be depressurized with the external environment. The breathable film covers on the fluid channel. The drying component is disposed on the support portion and is located between the support portion and the breathable film, and the drying component is configured to absorb moisture entering the fluid channel. In the present disclosure, the drying component is provided inside of the breathable film of the pressure balancing device, and water vapor entering the pressure balancing device is absorbed by the drying component.

10 Claims, 8 Drawing Sheets

PRESSURE BALANCING DEVICE

CROSS REFERENCES TO RELATED APPLICATIONS

This application claims the benefit of Chinese Patent Application No. 202010236508.7, filed on Mar. 30, 2020, which is incorporated herein by reference in its entirety.

TECHNICAL FIELD

The present disclosure relates to a pressure balancing device, and in particular, to a pressure balancing device for use in a battery pack.

BACKGROUND

A battery pack generates heat during use, causing the temperature of the battery pack to rise. When the temperature of gas inside the battery pack increases, the pressure inside the battery pack increases. If the gas inside the battery pack is not discharged outward in time, the normal use of the battery will be affected. Therefore, it is often necessary to mount a pressure balancing device on the battery pack, and the gas inside the battery pack is discharged to the external environment through the pressure balancing device to ensure the pressure balance between the inside and the outside of the battery pack.

SUMMARY OF THE DISCLOSURE

The present disclosure provides a pressure balancing device, which can dry gas entering the pressure balancing device from the external environment while ensuring the pressure relief effect.

The pressure balancing device according to the present disclosure comprises a mounting seat, a breathable film and a drying component, wherein the mounting seat comprises a mounting seat housing and a support portion. A fluid channel is formed in the mounting seat housing, and the fluid channel is capable of fluidly communicating an interior space of a component to be depressurized with the external environment. The support portion is disposed in the fluid channel, and is connected to the mounting seat housing. The breathable film covers the fluid channel. The drying component is disposed on the support portion and is located between the support portion and the breathable film, and the drying component is configured to absorb moisture entering the fluid channel.

In the pressure balancing device described above, the support portion is disposed transversely to the fluid channel, and a plurality of hollowed-out support portion channels are disposed on the support portion, so that gas can flow through the plurality of hollowed-out support portion channels.

In the pressure balancing device described above, the drying component comprises a plurality of desiccant particles disposed on the support portion; and the plurality of hollowed-out support portion channels are sized such that the plurality of desiccant particles cannot pass through the plurality of hollowed-out support portion channels.

In the pressure balancing device described above, the mounting seat further comprises a partition forming at least two sub-regions in the fluid channel between the support portion and the breathable film, and the plurality of desiccant particles are disposed in part of sub-regions of the plurality of sub-regions.

In the pressure balancing device described above, the partition is provided with a plurality of hollowed-out partition channels, and the plurality of hollowed-out partition channels enable the plurality of sub-regions to be in fluid communication.

In the pressure balancing device described above, the partition comprises a central column and a plurality of partition plates, the plurality of partition plates are disposed around the central column, and each partition plate of the plurality of partition plates is provided with a plurality of hollowed-out partition channels.

In the pressure balancing device described above, the pressure balancing device further comprises a cover having a top plate overlying the partition, and the top plate is configured to cover a part of the sub-regions containing the plurality of desiccant particles to retain the plurality of desiccant particles within the part of the sub-regions. The top plate is provided with a plurality of hollowed-out top plate channels, and the plurality of hollowed-out top plate channels are sized such that the plurality of desiccant particles cannot pass through the plurality of hollowed-out top plate channels.

In the pressure balancing device described above, the cover further comprises a mounting insert, wherein one end of the mounting insert is connected to the top plate, the other end of the mounting insert is provided with a snap-on structure, the support portion is provided with a support portion mounting hole, and the snap-on structure is snapped in the support portion mounting hole.

In the pressure balancing device described above, the plurality of desiccant particles are made of silica gel desiccant, alumina gel desiccant, or molecular sieve desiccant.

In the pressure balancing device described above, the mounting seat housing further comprises a cavity with opening, the breathable film is located between the cavity and the fluid channel, and the fluid channel is in fluid communication with the external environment through the cavity.

When the internal gas pressure of a battery pack decreases during storage or use, water vapor entrained in the air in the external environment easily enters the battery pack through the pressure balancing device. In the present disclosure, desiccant is disposed inside the pressure balancing device, and the drying nature of the desiccant is used to absorb the water vapor entering the battery pack, in order not to affect the normal operation of the battery pack due to the presence of the internal water vapor.

BRIEF DESCRIPTION OF THE DRAWINGS

These and other features and advantages of the present disclosure may be better understood by reading the following detailed description with reference to the accompanying drawings. The same reference numerals represent the same components throughout the accompanying drawings, in which.

DETAILED DESCRIPTION OF EMBODIMENTS

Figure 1:
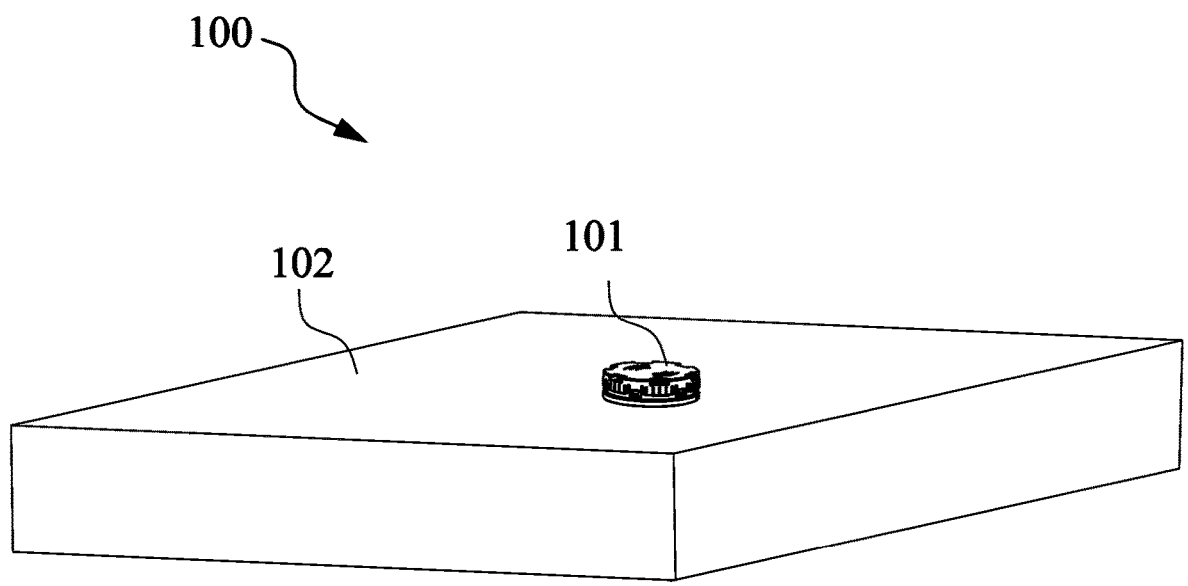
FIG. 1 is a schematic diagram of a battery pack provided with a pressure balancing device according to an embodiment of the present disclosure.

Various specific embodiments of the present disclosure are described below with reference to the accompanying drawings which constitute part of this description. It should be understood that although the terms such as "front", "rear", "upper", "lower", "left", and "right" indicating directions in the present disclosure are used to describe various exemplary structural parts and elements in the present disclosure, these terms used herein are merely used for ease of description and are determined based on the exemplary orientation shown in the accompanying drawings. Since the embodiments disclosed in the present disclosure can be arranged in different directions, these terms indicating directions are only illustrative and should not be considered as limitations. If possible, the same or similar reference numerals used in the present disclosure refer to the same or similar parts.

FIG. 1 shows a schematic diagram of a battery pack 100 provided with a pressure balancing device according to an embodiment of the present disclosure. As shown in FIG. 1, the battery pack 100 is generally rectangular. In other embodiments, the battery pack 100 may have other shapes. The battery pack 100 comprises a battery pack housing 102 and a pressure balancing device 101. The battery pack housing 102 has an accommodating space formed therein for accommodating battery cells (not shown). The pressure balancing device 101 is mounted on the battery pack housing 102. The pressure balancing device 101 is in communication with the accommodating space inside the battery pack housing 102, and thus can relieve the pressure in the accommodating space inside the battery pack housing 102. In this embodiment, the pressure balancing device 101 is used in the battery pack 100, and the battery pack 100 is a component to be depressurized. In other embodiments, the pressure balancing device 101 can also be applied to other components that need to be depressurized. In this embodiment, the battery pack 100 using the pressure balancing device 101 is mounted in an electric vehicle, such as an electric automobile or a hybrid vehicle. In other embodiments, the pressure balancing device 101 may also be used in battery packs 100 in other technical fields.

Figure 2A:
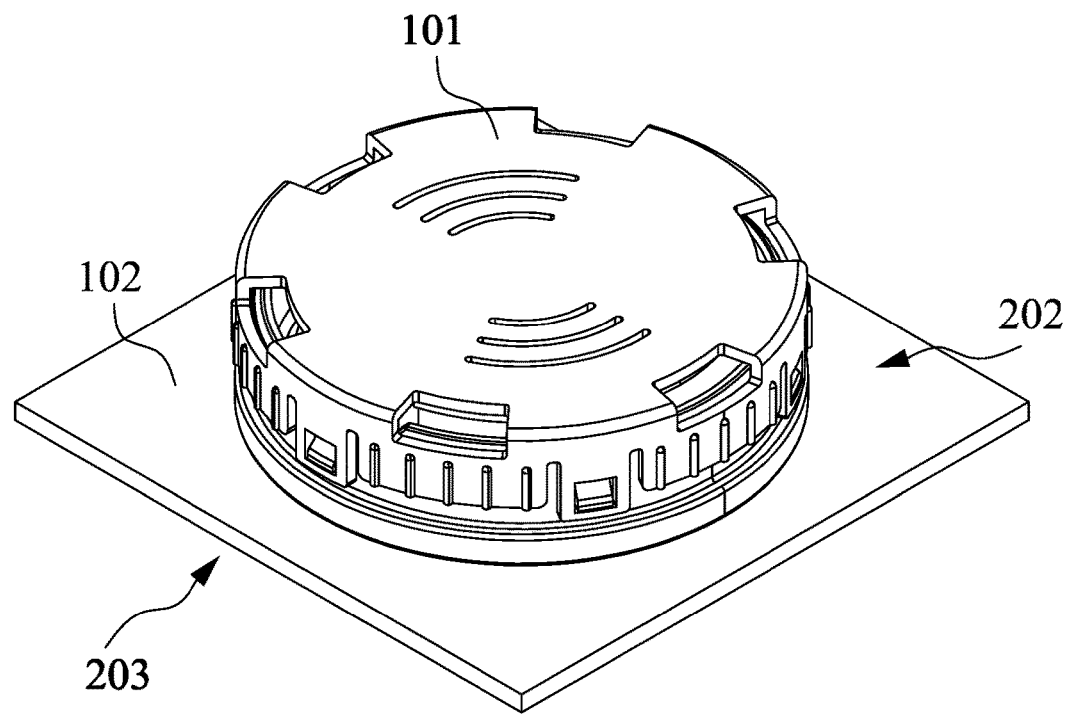
FIG. 2A and FIG. 2B are respectively partial enlarged views of the pressure balancing device mounted on a battery pack housing in FIG. 1 from different perspectives.
Figure 2B:
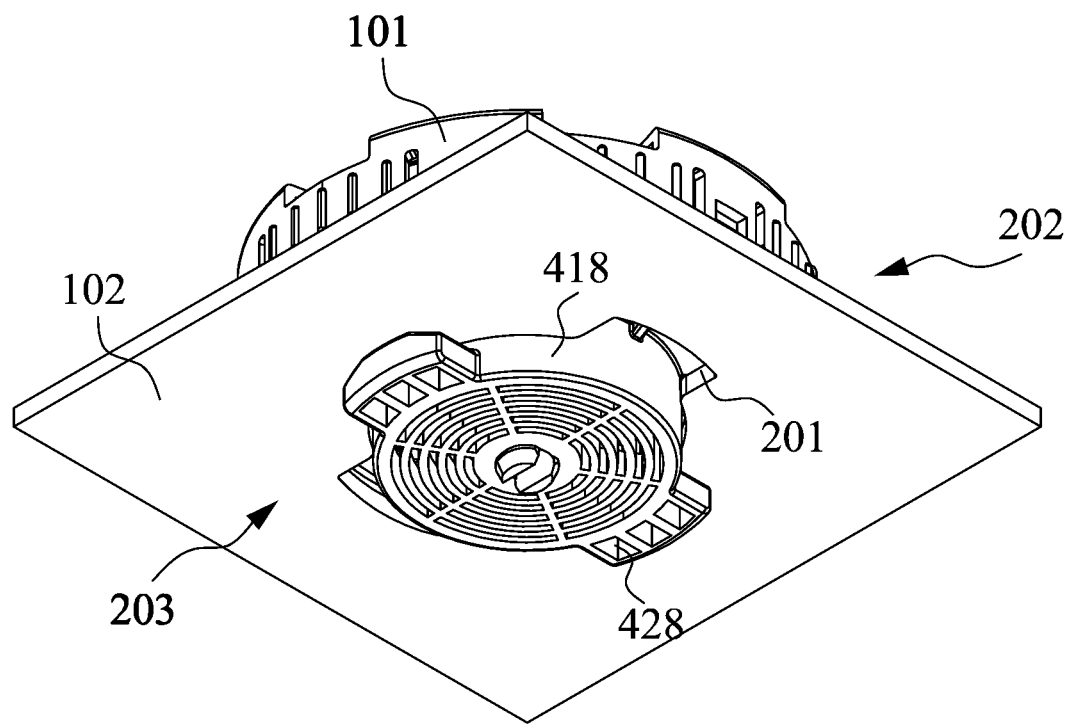

FIG. 2A and FIG. 2B respectively show partial enlarged views of the pressure balancing device 101 mounted on a battery pack housing 102 in FIG. 1 from different perspectives, wherein in order to show the pressure balancing device 101 more clearly, only a part of a top wall of the battery pack housing 102 is shown. FIG. 2A is a perspective diagram of the pressure balancing device 101 as viewed from outer surface 202 side of the battery pack housing 102, and FIG. 2B is a perspective diagram of the pressure balancing device 101 as viewed from inner surface 203 side of the battery pack housing 102. As shown in FIGS. 2A and 2B, the top wall of the battery pack housing 102 is in the form of a flat plate, and is provided with a mounting hole 201. The pressure balancing device 101 is snapped and mounted on the top wall of the battery pack housing 102 through the mounting hole 201. A lower portion of the pressure balancing device 101 extends into the accommodating space inside the battery pack housing 102, so that the pressure balancing device 101 can communicate with the accommodating space inside the battery pack housing 102. An upper portion of the pressure balancing device 101 is exposed to the external environment, so that the accommodating space inside the battery pack housing 102 can communicate with the external environment through the pressure balancing device 101. When the gas pressure inside the battery pack 100 is greater than the gas pressure of the external environment, the gas inside the battery pack 100 can be released to the external environment through the pressure balancing device 101, so that the pressure balancing device 101 has a function of releasing the pressure of the battery pack 100. However, during the storage or use of the battery pack 100, the gas pressure inside the battery pack 100 may be lower than the ambient air pressure. In this case, the gas in the external environment may also flow into the battery pack 100 through the pressure balancing device.

Figure 3:
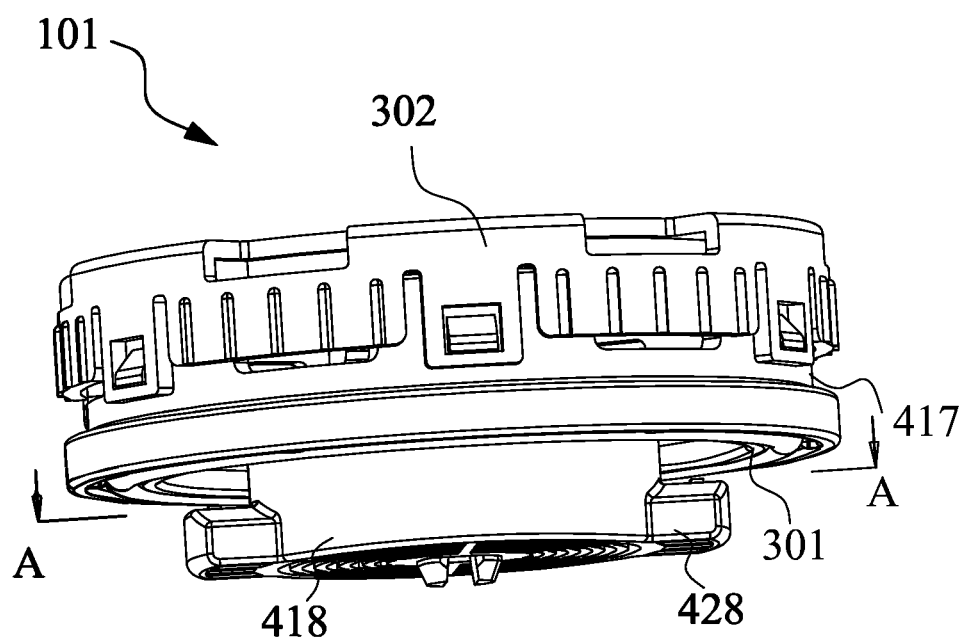
FIG. 3 is a perspective diagram of the pressure balancing device in FIG. 2A.

FIG. 3 shows a perspective diagram of the pressure balancing device 101 in FIG. 2A. The pressure balancing device 101 is generally in the form of a button and comprises a protective cover 302 and a mounting seat 301. The protective cover 302 overlays the mounting seat 301. In this embodiment, the protective cover 302 and the mounting seat 301 are connected together by means of snap-fit.

Figure 4:
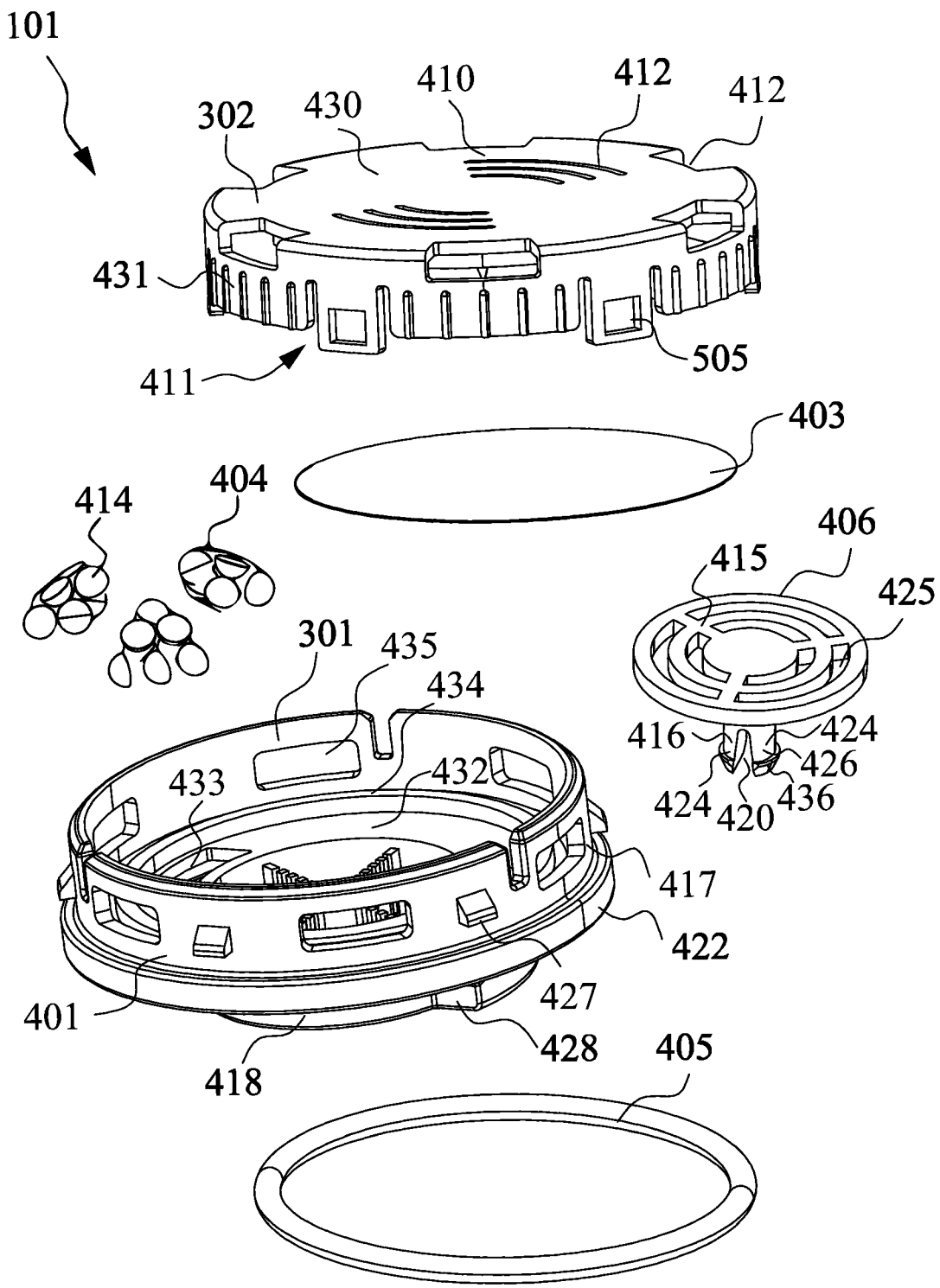
FIG. 4 is an exploded view of the pressure balancing device in FIG. 3.

FIG. 4 is an exploded view of the pressure balancing device 101. As shown in FIG. 4, the pressure balancing device 101 comprises, in addition to the protective cover 302 and the mounting seat 301, a breathable film 403, a drying component 404, a cover 406 and a sealing ring 405. The breathable film 403, the drying component 404 and the cover 406 are disposed inside the mounting seat 301 in the accommodating space formed by the protective cover 302 and the mounting seat 301.

The protective cover 302 comprises a top cover 430 and a cover wall 431. The top cover 430 is in the form of a circular flat plate, and comprises an outer top cover surface 410 and an inner top cover surface 411. The outer top cover surface 410 faces the external environment, and the inner top cover surface 411 faces the battery pack housing 102. The cover wall 431 is perpendicular to the top cover 430, and is formed by extending from an outer periphery of the top cover 430 in a direction away from the top cover 430. The protective cover 302 is provided with a plurality of protective cover through holes 412 for communicating the interior space of the pressure balancing device 101 with the external environment, so as to help discharge the gas inside the pressure balancing device 101 to the external environment. Each of the plurality of protective cover through holes 412 is in the form of a curved elongated hole, wherein part of the protective cover through hole 412 is located in the top cover 430, and the remaining part of the protective cover through hole 412 is located in the junction between the top cover 430 and the cover wall 431.

The breathable film 403 is a round sheet, and is made of a waterproof and breathable material. The breathable film 403 can prevent dust and liquid in the external environment from entering the battery pack 100 while ensuring the gas communication between the inside of the battery pack 100 and the external environment, thereby achieving the dust-proof, waterproof and breathable effects. In this embodiment, the breathable film 403 is made of an ePTFE material, which meets the requirements of IP67.

The drying component 404 is made of silica gel desiccant, alumina gel desiccant, or molecular sieve desiccant, and is used to absorb moisture in the pressure balancing device 101. In this embodiment, the drying component 404 comprises a plurality of desiccant particles 414, and the plurality of desiccant particles 414 are spherical or hemispherical. In other embodiments, the drying component 404 may also be made into other shapes and structures.

The cover 406 is generally in the form of an umbrella, and comprises a top plate 415 and a mounting insert 416. The top plate 415 is in the form of a circular plate, a plurality of hollowed-out top plate channels 425 are provided in the top plate 415, and fluid can circulate through the top plate channels 425. The mounting insert 416 is generally cylindrical, and extends vertically downward from the center of a lower surface of the top plate 415. The mounting insert 416 is connected to the top plate 415 at one end, and is provided with a snap-on structure 426 on the other end. The snap-on structure 426 is disposed at distal end position on the mounting insert 416 to implement the snap-on engagement between the cover 406 and the mounting seat 301. The snap-on structure 426 comprises flanges 436 and grooves 420. The flanges 436 are disposed circumferentially on the distal end of the mounting insert 416, and protrude from a main body of the mounting insert 416 to form snap-on portions. The grooves 420 are formed by extending inward from the middle of an end face of the distal end of the mounting insert 416. The grooves 420 run radially through the entire end face of the distal end, so that two mounting branch arms 424 are formed at the distal end position on the mounting insert 416. In a free state, the distal ends of the two mounting branch arms 424 are spaced apart from each other and are in an expanded position. When the two mounting branch arms 424 are pressed by an external force, the two mounting branch arms 424 can contract relative to each other towards the grooves 420 until inner sides of the two mounting branch arms 424 abut together and are in a contracted position. When the external force is removed, the two mounting branch arms 424 pop spring back outwardly away from each other and return to the expanded position. The above arrangement of the snap-on structure 426 enables the snap-on structure 426 to be expandable and contractible, and the cover 406 can be securely mounted on the mounting seat 301 by means of the snap-on structure 426.

The mounting seat 301 comprises a mounting seat housing 401, and the mounting seat housing 401 is generally in the form of a sleeve. As shown in FIG. 4, the mounting seat housing 401 comprises an upper housing portion 417 and a lower housing portion 418, both of which are in the form a straight cylinder and are arranged coaxially. The upper housing portion 417 is connected to and disposed above the lower housing portion 418. The cross sections of the upper housing portion 417 and the lower housing portion 418 are both generally circular, and the outer diameter of the upper housing portion 417 is greater than that of the lower housing portion 418.

A lower end of the upper housing portion 417 and an upper end of the lower housing portion 418 are connected via a platform 432, and the platform 432 is in the form of a flat plate, so that the upper housing portion 417 and the lower housing portion 418 jointly form a stepped structure. The platform 432 is provided with a film supporting frame 434 at a position close to an inner wall of the upper housing portion 417 for securing the breathable film 403. The film supporting frame 434 is annular and protrudes upward from an upper surface of the platform 432. The platform 432 is further provided with two platform through holes 433, and the two platform through holes 433 are provided on two opposite sides of the platform 432 (see FIG. 6).

The mounting seat 301 is further provided with a mounting component 422 at the joint of the upper housing portion 417 and the lower housing portion 418, and the mounting component 422 is used to mount the sealing ring 405. The mounting component 422 is disposed around the outer periphery of the mounting seat housing 401, and extends outward from an outer surface of the upper housing portion 417 to form a protruding annular platform.

It can be seen with respect to FIGS. 3 and 4 that the outer surface of the lower housing portion 418 is provided with two lugs 428, and the two lugs 428 are located on two opposite ends of the lower housing portion 418, and extend outward from the outer surface of the lower housing portion 418. The arrangement of the lugs 428 can facilitate the mounting of the pressure balancing device 101 on the battery pack housing 102 by means of snap-fit.

The sealing ring 405 is annular and is configured to be mounted on a lower surface of the mounting component 422 to achieve sealed mounting between the mounting seat 301 of the pressure balancing device 101 and the battery pack housing 102. The sealing ring 405 may be made of elastic materials such as silica gel or rubber. In this embodiment, the sealing ring 405 is made of VMQ or EPDM material.

Figure 5:
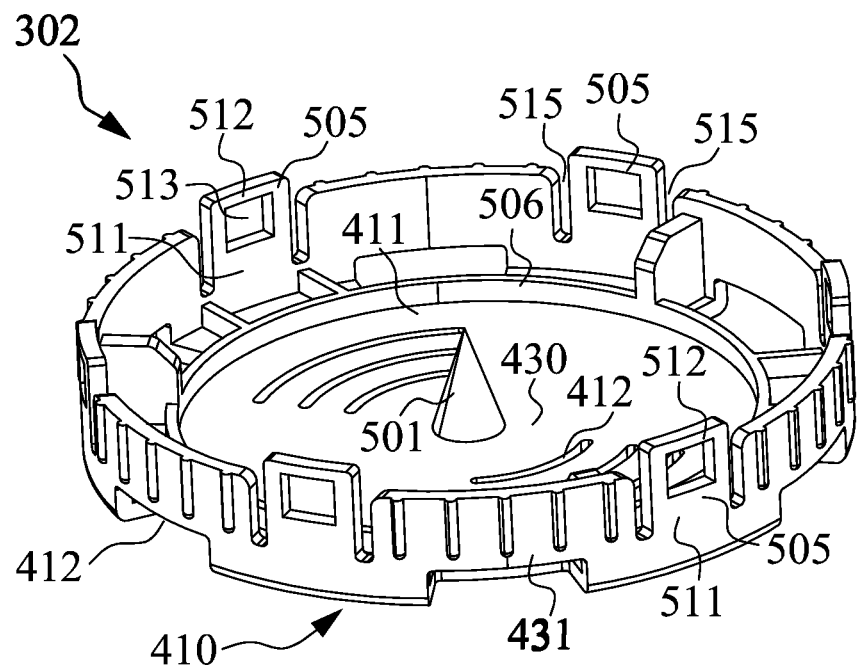
FIG. 5 is a perspective diagram of a protective cover in FIG. 4 from another perspective.

FIG. 5 is a perspective diagram of the protective cover 302 in FIG. 4 from another perspective, showing the structure of the protective cover 302 as seen after turning over from bottom to top. As shown in FIG. 5, the inner top cover surface 411 is provided with a tip part 501, the tip part 501 is generally tapered with an end provided with a spiked portion. As shown in FIG. 5, the extension direction of the tip part 501 is the same as the extension direction of the cover wall 431. The inner top cover surface 411 is further provided with a rib 506, and the rib 506 protrudes from the inner top cover surface 411. When the protective cover 302 is mounted on the mounting seat 301, the rib 506 can abut against the top end of the mounting seat 301 (see FIG. 7A and FIG. 7B). In this embodiment, the rib 506 is annular, and is disposed close to the outer periphery of the top cover 430.

The cover wall 431 is provided with a plurality of buckles 505, and the buckles 505 are formed using a body of the cover wall 431. Inner and outer surfaces of the buckles 505 are flush with both the inner and outer surfaces of the cover wall 431. The cover wall 431 is provided with a partition slot 515 respectively on each of left and right sides of the buckle 505. The partition slot 515 extends from the outer edge of the cover wall 431 toward the top cover 430, so that the left and right sides of the buckle 505 are spaced apart from the body of the cover wall 431. The partition slot 515 is provided such that only the end of the buckle 505 facing the top cover 430 is connected integrally with the cover wall 431. The end of the buckle 505 connected to the cover wall 431 is a connecting end 511, and the end opposite the connecting end 511 is a free end 512. When an external force is applied to the free end 512 of the buckle 505, the free end 512 of the buckle 505 can expand and contract with respect to the cover wall 431. That is to say, when an external force toward the inner side of the protective cover 302 is applied to the free end 512 of the buckle 505, the free end 512 of the buckle 505 will deflect in the direction of the inner surface of the buckle 505; When an external force toward the outside of the protective cover 302 is applied to the free end 512 of the buckle 505, the free end 512 of the buckle 505 will deflect in the direction of the outer surface of the buckle 505. The buckle 505 is provided with a buckle hole 513 close to the free end 512. The buckle hole 513 is a generally square through hole, which penetrates from the inner surface to the outer surfaces of the buckle 505 and is used for the snap-fit connection between the protective cover 302 and the mounting seat 301. In this embodiment, the protective cover 302 has six buckles 505 uniformly disposed on the cover wall 431. In other embodiments, it is also possible to provide a different number of buckles 505.

Figure 6:
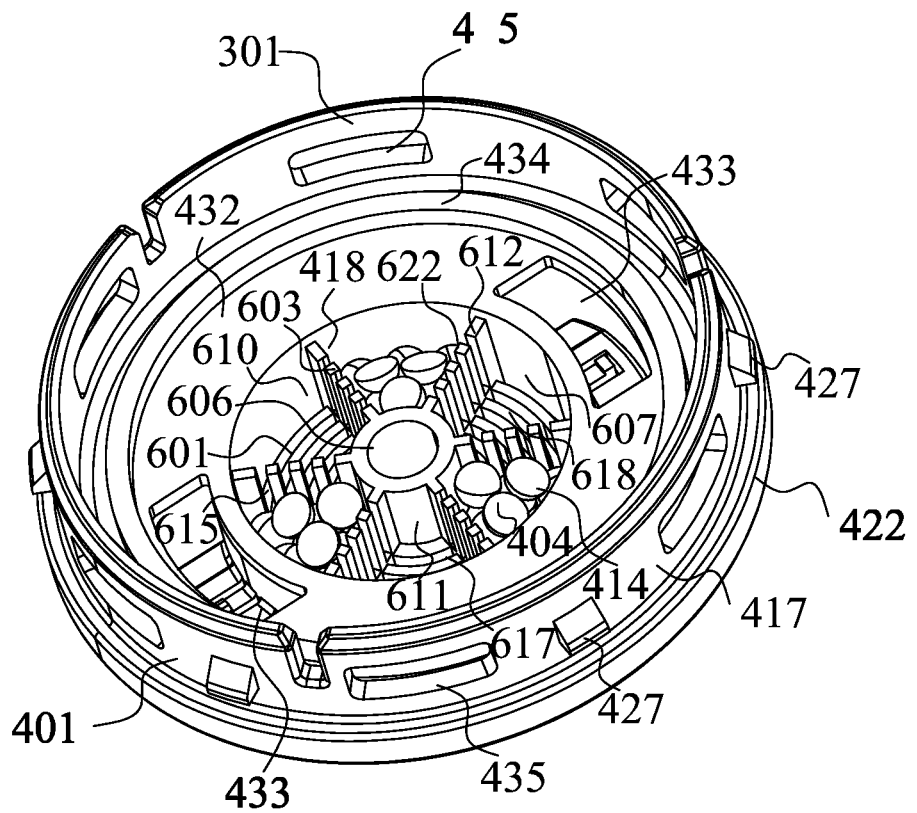
FIG. 6 is a perspective diagram of a mounting seat in FIG. 4 with a drying component arranged thereon.

FIG. 6 is a perspective diagram of the mounting seat 301 in FIG. 4 with a drying component 404 arranged thereon. As shown in FIG. 6, the mounting seat 301 is provided with a plurality of upper housing openings 435 in the upper housing portion 417, and the plurality of upper housing openings 435 are disposed at intervals in the circumferential direction of the upper housing portion 417. Each of the upper housing openings 435 is in the form of a elongated opening, and the length direction thereof is identical to the circumferential direction of the upper housing portion 417. In this embodiment, the mounting seat 301 is provided with six upper housing openings 435. In other embodiments, a different number of upper housing openings 435 may be provided. The arrangement of the upper housing openings 435 facilitates fluid communication between the pressure balancing device 101 and the external environment. A plurality of bumps 427 are provided on the outer surface of the upper housing portion 417, and each of the bumps 427 is formed by protruding outward from the outer surface of the upper housing portion 417. The plurality of bumps 427 are disposed circumferentially on the outer surface of the upper housing portion 417, and the plurality of bumps 427 are located at the same level on the outer periphery of the upper housing portion 417, and are arranged at even intervals in the circumferential direction of the upper housing portion 417. The number of the bumps 427 is the same as the number of the buckles 505 on the protective cover 302, so that the bumps 427 on the mounting seat 301 can be snapped-fit with the buckles 505 on the protective cover 302 to realize the fastened connection between the mounting seat 301 and the protective cover 302. Corresponding to the fact that six buckles 505 are uniformly disposed on the protective cover 302 in this embodiment, the mounting seat 301 is also provided with six bumps 427 uniformly disposed on the outer surface of the upper housing portion 417.

It can be seen with respect to FIGS. 3, 4 and 6 that the mounting seat 301 is provided with a support portion 601 at the bottom of the lower housing portion 418. The support portion 601 is generally in the form of a flat plate, and the shape and size of the support portion 601 are respectively the same as those of the cross section of the lower housing portion 418. The support portion 601 is arranged perpendicular to the axial direction of the straight cylinder where the lower housing portion 418 is located, thereby forming the bottom of the mounting seat 301. In this embodiment, the support portion 601 is formed integrally with the mounting seat housing 401. A partition 603 is provided in an interior space region 610 enclosed by the lower housing portion 418 and the support portion 601. The partition 603 comprises a central column 611 and a plurality of partition plates 612. The central column 611 is located at the center of the support portion 601, and the central column 611 is disposed perpendicular to the support portion 601. That is, the center column 611 extends in the axial direction of the lower housing portion 418. The support portion 601 is further provided with a support portion mounting hole 606 for snapping and engaging with the snap-on structure 426 of the cover 406. The support portion mounting hole 606 is located at the center of the support portion 601, and extends upward from the support portion 601 and penetrates axially through the central column 611. That is to say, the support portion mounting hole 606 penetrates through the support portion 601 and the central column 611, and the support portion mounting hole 606 is formed at the central column 611 and the middle position of the support portion 601.

Each of the partition plates 612 is generally in the form of a flat plate, and the plurality of partition plates 612 each are disposed perpendicular to the support portion 601 and are radial around the central column 611. The partition plate 612 is connected to the center column 611 at one end, and is connected to the inner wall of the lower housing portion 418 at the other end. The plurality of partition plates 612 are uniformly distributed in the space region 610, so that the space region 610 is divided into a plurality of sub-regions 607 with the same size. The cross section of each of the sub-regions 607 is generally triangular. In this embodiment, six partition plates 612 are provided in the mounting seat 301 to divide the space region 610 in the lower housing portion 418 into six sub-regions 607. The plurality of desiccant particles 414 of the drying component 404 are generally divided into three parts with equal amount, and the three parts of desiccant particles 414 are respectively placed in the six sub-regions 607 alternately. That is to say, of any two adjacent sub-regions 607, there must be one sub-region 607 with desiccant particles 414 provided therein, and the other sub-region 607 does not have desiccant particles 414. The desiccant component 404 is provided in the form of particles and is divided into a plurality of parts that are disposed alternately in a plurality of sub-regions 607, which is advantageous to reducing the interference from the desiccant component 404 on the air flow, reserves a sufficient flow space for the circulation of the gas in the space region 610 of the lower housing portion 418, and promotes fluid communication of the gas in the space region 610.

The support portion 601 is provided with a plurality of hollowed-out support portion channels 617, and the partition plate 612 is provided with a plurality of hollowed-out partition channels 615 for facilitating the circulation of fluid through the support portion 601 and the partition plate 612. The arrangement of the support portion channels 617 enables the space region 610 of the lower housing portion 418 to be in fluid communication with the interior space of the battery pack 100, and the arrangement of the partition channels 615 enables air to circulate between the six sub-regions 607 in the lower housing portion 418. The support portion channel 617 and the partition channel 615 are respectively sized such that the plurality of desiccant particles 414 will not pass through the support portion channel 617 and the partition channel 615, so as to ensure that the desiccant particles 414 have relatively fixed positions and are respectively maintained within corresponding sub-regions 607. In this embodiment, each of the plurality of partition plates 612 is in the form of a grid plate and is composed of a plurality of bar-shaped separate bars 622. The plurality of bar-shaped separate bars 622 each are perpendicular to the support portion 601, and the plurality of bar-shaped separate bars 622 are disposed at intervals. That is to say, the space between two adjacent separate bars 622 of the plurality of bar-shaped separate bars 622 forms a plurality of the partition channels 615, and the distance between two adjacent bar-shaped separate bars 622 is smaller than the particle size of the desiccant particles 414. The support portion 601 is formed jointly by a plurality of annular support slats 618. The plurality of annular support slats 618 are arranged sequentially from inside to outside at intervals with the central column 611 as the center, and the plurality of annular support slats 618 are connected together via connecting plates 712 at the positions where the annular supporting slats intersect with the partition plates 612 (see FIG. 7B). That is to say, the space between two adjacent supporting slats 618 of the plurality of supporting slats 618 forms a plurality of the support portion channels 617, and the distance between two adjacent supporting slats 618 is smaller than the particle size of the desiccant particles 414.

Figure 7A:
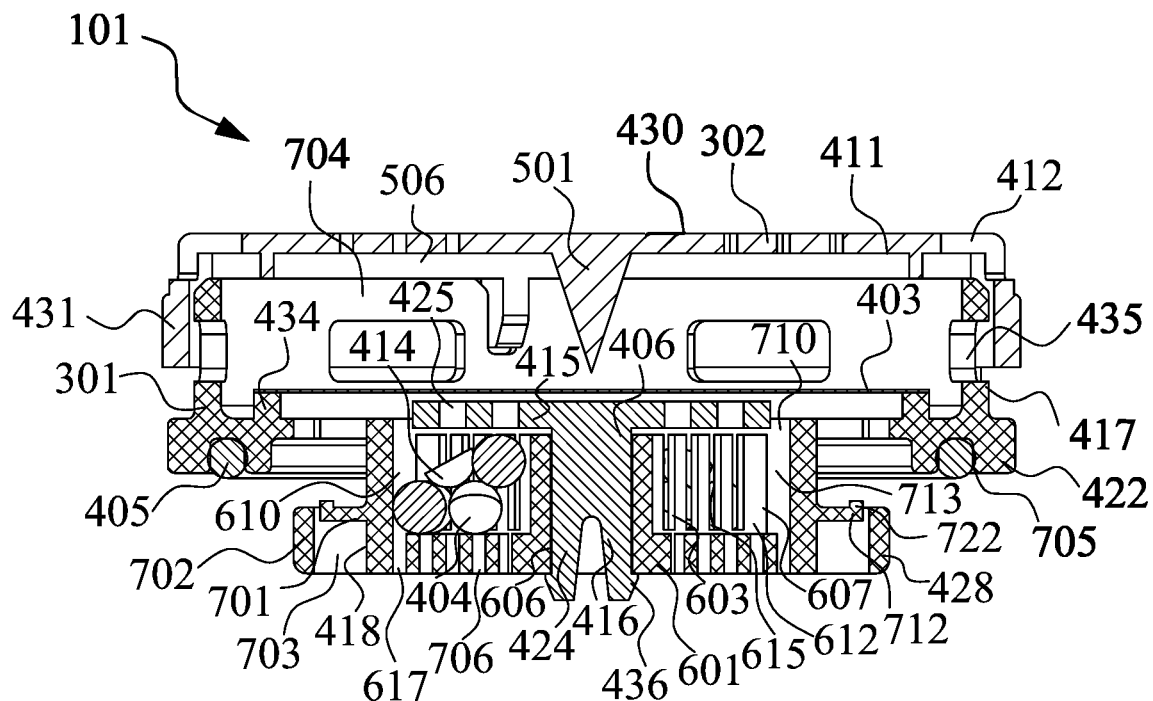
FIG. 7A and FIG. 7B are respectively longitudinal section views of the pressure balancing device in FIG. 3 at different cutaway positions.
Figure 7B:
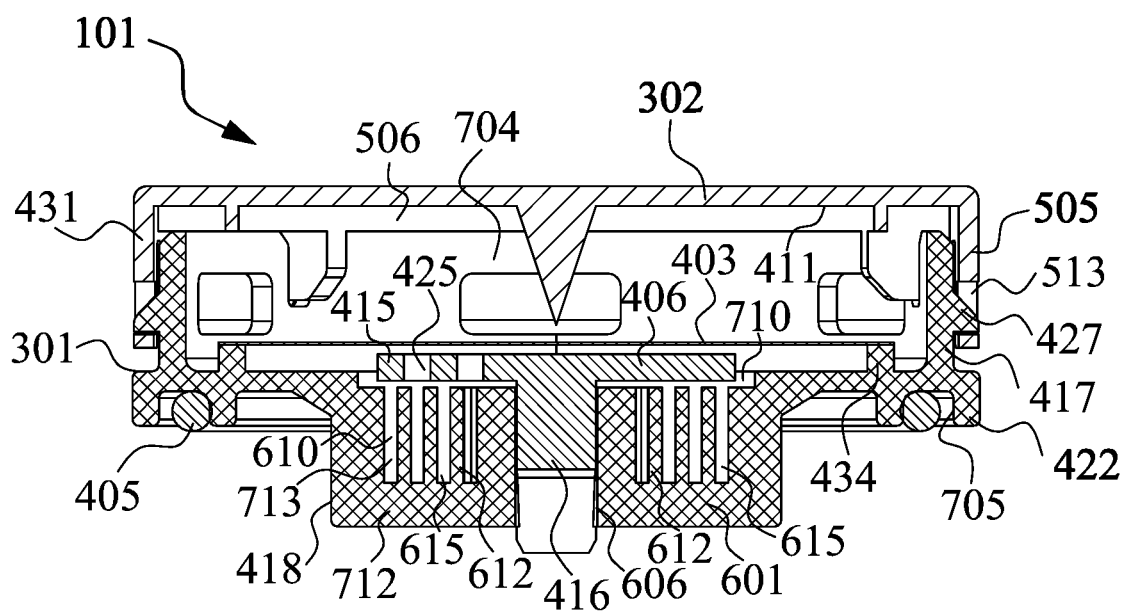

FIG. 7A and FIG. 7B are respectively longitudinal section views of the pressure balancing device 101 in FIG. 3 at different cutaway positions. In the cut position shown in FIG. 7A, the internal structure of two sub-regions 607 disposed oppositely inside the mounting seat 301 can be seen, wherein the sub-region 607 on the left has desiccant particles 414, and the sub-region 607 on the right does not have desiccant particles 414. The cutaway position shown in FIG. 7B is a position where the partition plate 612 inside the mounting seat 301 is located, and the structure of the partition plate 612 and the support portion 601 is shown.

As shown in FIGS. 7A and 7B, the protective cover 302 is snapped on the mounting seat 301, such that the breathable film 403, the drying component 404 and the cover 406 can be accommodated in the space formed by the mounting seat 301 and the protective cover 302. When the protective cover 302 is snapped on the mounting seat 301, the protective cover 302 is secured to the outer side of the upper housing portion 417 on the top of the mounting seat 301, and the inner surface of the protective cover 302 at the cover wall 431 is fitted to the outer surface of the upper housing portion 417 so as to ensure the secured connection between the protective cover 302 and the mounting seat 301 in a horizontal direction. It can be seen with respect to FIG. 4 and FIG. 7B that when the protective cover 302 is snapped downward from the top of the mounting seat 301, the buckles 505 can be expanded outward, such that the six bumps 427 are respectively accommodated in the buckle holes 513 of the six buckles 505. The fitting arrangement of the bump 427 and the buckle hole 513 can prevent the protective cover 302 from moving upward relative to the mounting seat 301. When the protective cover 302 is snapped on the top end of the mounting seat 301, the rib 506 provided on the inner top cover surface 411 of the protective cover 302 exactly abuts against the top end of the mounting seat 301, thereby preventing the protective cover 302 from moving downward relative to the mounting seat 301.

As shown in FIG. 7A, the cover 406 is snapped inside the mounting seat 301 through the support portion mounting hole 606, and the inner diameter of the support portion mounting hole 606 is substantially the same as the outer diameter of the mounting insert 416 of the cover 406. During mounting the cover 406 to the mounting seat 301, first, the two mounting branch arms 424 of the mounting insert 416 are retracted relative to each other, such that the mounting insert 416 is gradually fed into the support portion mounting hole 606 from the top of the support portion mounting hole 606. When the top plate 415 overlays the partition 603, distal end of the mounting insert 416 is located outside the support portion mounting hole 606, the two mounting branch arms 424 of the mounting insert 416 are in the expanded position, and when the flange 436 abuts against the lower surface of the support portion 601, the stable snap-fit between the cover 406 and the mounting seat 301 can be realized. As shown in FIGS. 7A and 7B, when the cover 406 is snapped inside the mounting seat 301, the main body of the mounting insert 416 is located in the support portion mounting hole 606, and the top plate 415 of the cover 406 constitutes the top of the interior space region 610 enclosed by the lower housing portion 418 and the support portion 601, such that the cover 406 and the mounting seat 301 together form an accommodating space for the desiccant particles 414. The area of the top plate 415 is slightly smaller than the cross-sectional area of the lower housing portion 418, and there is a spacing 710 between the outer edge of the top plate 415 and the upper end of the lower housing portion 418. The arrangement of an upper top plate channel 425 of the top plate 415 of the cover 406 and the arrangement of the spacing 710 between the top plate 415 and the lower housing portion 418 can facilitate the communication between the accommodating space of the dry particles 414 and fluid above the top plate 415. That is to say, the top and bottom of the accommodating space for the dry particles 414 can be in communication with the interior of the accommodating space for the dry particles 414. In the present disclosure, the dry particles 414 are disposed at the lower portion of the pressure balancing device 100, which does not hinder the fluid from passing through the lower portion of the pressure balancing device 100.

As shown in FIG. 7A, the breathable film 403 is disposed on the film supporting frame 434, and the size of the breathable film 403 is generally the same as the cross section enclosed by the film supporting frame 434, such that the breathable film 403 can exactly cover the top end of the film supporting frame 434. In this embodiment, the breathable film 403 is secured to the top end of the film supporting frame 434 by means of ultrasonic welding. In other embodiments, the breathable film 403 may also be connected to the film supporting frame 434 by other connection means, such as by bonding with an adhesive. The height of the film supporting frame 434 is configured such that the breathable film 403 is located above the cover 406 and is at a short distance from the top of the cover 406. The spacing between the breathable film 403 and the top of the cover 406 is configured to enable the pressure balancing device 101 to have a compact structure and do not hinder the flowing of fluid from the accommodating space for the dry particles below the cover 406 to the breathable film 403, ensuring the smooth circulation of the fluid below the breathable film 403.

As shown in FIG. 7A, the breathable film 403 divides the space formed by the protective cover 302 and the mounting seat 301 into an upper part and a lower part. The mounting seat 301 has a cavity 704 with opening formed above the breathable film 403, and the mounting seat 301 has a fluid channel 713 formed below the breathable film 403. The cavity 704 with opening is in fluid communication with the external environment through the plurality of upper housing openings 435 in the upper housing portion 417 or through the protection cover through holes 412 in the protective cover 302.

The arrangement of the breathable film 403 can allow gas from the cavity 704 with opening to enter the fluid channel 713, and at the same time prevent liquid from entering the fluid channel 713. As shown in FIG. 7A, in the fluid channel 713, a plurality of hollowed-out top plate channels 425 are provided in the top plate 415 of the cover 406, a spacing 710 is formed between the top plate 415 and the lower housing portion 418, the partition plate 612 is provided with a plurality of hollowed-out partition channels 615, the drying components 404 are in the form of particles and are arranged in a plurality of sub-regions 607 at intervals. The above arrangement enables the various regions inside the fluid channel 713 to be in fluid communication with each other. Further, when the pressure balancing device 101 is mounted on the battery pack housing 102, the fluid channel 713 in the mounting seat 301 can be in communication with the interior space of the battery pack 100 through a plurality of hollowed-out support portion channels 617 in the support portion 601.

As shown in FIGS. 7A and 7B, since the fluid channel 713 below the mounting seat 301 is in communication with the interior of the battery pack 100, the gas inside the battery pack 100 can enter the fluid channel 713. When the air pressure inside the battery pack 100 is greater than the air pressure of the external environment, the gas in the fluid channel 713 is slowly discharged to the cavity 704 above the mounting seat 301 through the breathable film 403 due to the pressure difference. As shown in FIG. 7A, since the cavity 704 is in communication with the external environment through the plurality of protective cover through holes 412 in the protective cover 302, the gas inside the battery pack 100 can be discharged to the external environment through the breathable film 403. However, when the air pressure inside the battery pack 100 increases to a certain value, the air permeability efficiency of the breathable film 403 cannot meet the exhaust demand of the battery pack 100. In this case, the breathable film 403 secured on the film supporting frame 434 will deform and bulge upward, and the middle of the breathable film 403 has the maximum deformation. As shown in FIGS. 7A and 7B, the tip part 501 on the inner side of the protective cover 302 is located just above the middle of the breathable film 403. When the breathable film 403 bulges up until it comes into contact with the tip part 501, the tip part 501 pierces the breathable film 403. After the breathable film 403 is pierced, the gas inside the battery pack 100 can be concentratedly discharged from a hole formed by piercing the breathable film 403, thereby realizing the effect of quick pressure relief and preventing gas pressure inside the battery pack 100 from being excessive. That is to say, when the pressure inside the battery pack 100 does not reach a predetermined air pressure value, the breathable effect of the battery pack 100 is achieved by the breathable film 403; and when the pressure inside the battery pack 100 is greater than or equal to the predetermined air pressure value, the tip part 501 pierces the breathable film 403 to form a hole, and the battery pack 100 quickly releases the pressure through the hole of the breathable film 403. The predetermined (or critical) air pressure value for the quick pressure release of the battery pack 100 can be adjusted by changing the performance of the breathable film 403 and the distance between the tip part 501 and the breathable film 403.

The breathable film 403 is disposed between the cavity 704 and the fluid channel 713, the cavity 704 can be in communication with the external environment, and the fluid channel 713 is in communication with the interior space of the battery pack 100. The breathable film 403 can prevent liquid in the external environment from entering the interior space of the battery pack 100. However, when water is in the gaseous form of water vapor, the breathable film 403 cannot prevent the water vapor from entering the battery pack 100. That is to say, when the internal gas pressure of the battery pack 100 is lower than the ambient air pressure, the breathable film 403 cannot prevent the water vapor in the air in the external environment from entering the interior space of the battery pack 100. The entry of the water vapor into the battery 100 will also affect the normal operation of the battery cells therein. In the present disclosure, the drying component 404 is provided on the inner side of the breathable film 403 in the pressure balancing device 101, such that if the water vapor in the external environment penetrates the breathable film 403 and enters the inner side of the breathable film 403, the water vapor will be absorbed by the drying component 404. As the desiccant component 404 is located on the inner side of the breathable film 403, the breathable film 403 can prevent liquid from entering the battery pack 100. Therefore, the desiccant component 404 in the embodiment of the present disclosure will not be exposed to a large amount of liquid and has high drying activity. It thus can be seen that the arrangement of the desiccant component 404 on the inner side of the breathable film 403 in the present disclosure can reduce the internal humidity of the battery pack 100 and prevent the liquid in the external environment from compromising the desiccant component 404, thereby effectively maintaining the activity of the desiccant component 404 and improving the use efficiency of the desiccant component 404.

The fitting arrangement of the mounting component 422 on the mounting seat 301 and the two lugs 428 enables the pressure balancing device 101 to be easily mounted on the battery pack housing 102. As shown in FIG. 7A, the two lugs 428 are arranged at the same level on the outer surface of a lower snap-on portion 403. The two lugs 428 each are located below the mounting component 422 and are spaced apart from the mounting component 422 at a distance. The distance between the mounting component 422 and the lower housing portion 418 is equal to the thickness of the top wall of the battery pack housing 102 or is slightly greater than the thickness of the battery pack housing 102. When the pressure balancing device 101 is mounted on the top wall of the battery pack housing 102, the top wall of the battery pack housing 102 can be just engaged between the mounting component 422 and the lower housing portion 418.

As shown in FIGS. 7A and 7B, a sealing ring engaging groove 705 is provided on the lower surface of the mounting component 422. The sealing ring engaging groove 705 is generally annular, and the sealing ring 405 is disposed in the sealing ring engaging groove 705. The dimension of an accommodating space of the annular sealing ring engaging groove 705 is not uniform in a circumferential direction. The accommodating space in a certain region is slightly smaller than the volume of the portion of the sealing ring 405 located in the region. In the region, the sealing ring 405 and the sealing ring engaging groove 705 are engaged together by interference fit. In the other region, the accommodating space in the sealing ring engaging groove 705 is greater than the volume of the portion of the sealing ring 405 located in the region, so as to compensate the margin of the sealing ring 405 extruded in the interference-engaging region. FIG. 7A shows interference fit between the sealing ring 405 and the sealing ring engaging groove 705, and FIG. 7B shows non-interference fit between the sealing ring 405 and the sealing ring engaging groove 705. The fitting arrangement of the sealing ring engaging groove 705 and the sealing ring 405 helps the sealing ring 405 to be stably assembled in the sealing ring engaging groove 705, which can not only ensure the firm engagement between the sealing ring 405 and the sealing ring engaging groove 705, and but also ensure that the sealing ring 405 is snugly fitted in the sealing ring engaging groove 705. In other embodiments, the sealing ring 405 can also be secured to the lower surface of the mounting seat 301 by means of secondary molding.

Figure 8:
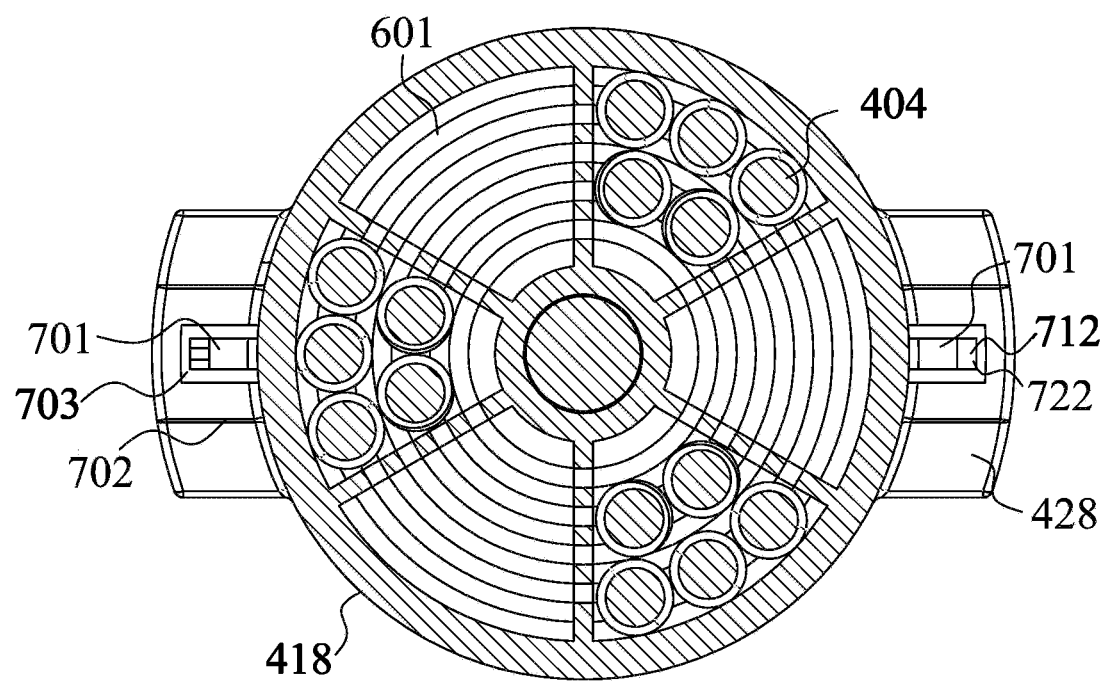
FIG. 8 is a transverse section view of the pressure balancing device in FIG. 3 along line A-A.

FIG. 8 is a cross-sectional view of the pressure balancing device 101 in FIG. 3 along line A-A, showing the structure of the pressure balancing device 101 at the two lugs 428. As shown in FIG. 8, the two lugs 428 are mounted on the outer surface of the lower housing portion 418 like a pair of outer ears. It can be seen with respect to FIG. 7A that each of the lugs 428 comprises one elastic arm 701 and one accommodating portion 702. One end of the accommodating portion 702 is secured on the outer surface of the lower housing portion 418, the accommodating portion 702 has an accommodating space 703 therein, and the elastic arm 701 is generally located in the accommodating space 703. One end of the elastic arm 701 is secured on the outer surface of the lower housing portion 418, the other end of the elastic arm 701 is a free end 712, and an upper surface of the free end 712 is provided with a protrusion 722 protruding toward the mounting component 422. As shown in FIG. 7A, in the free state, the upper surface of the elastic arm 701 is generally flush with the upper surface of the accommodating portion 702, and the protrusion 722 on the free end 712 of the elastic arm 701 is higher than the upper surface of the accommodating portion 702. When a downward force is applied to the free end 712 of the elastic arm 701, the free end 712 of the elastic arm 701 can move downward, such that the entire elastic arm 701 is accommodated in the accommodating space 703 of the accommodating portion 702.

It can be seen with respect to FIG. 3 to FIG. 8 that in order to assemble the pressure balancing device 101, the plurality of desiccant particles 414 can be disposed at intervals in the plurality of sub-regions 607 in the lower housing portion 418 of the mounting seat 301, and then cover 406 is engaged to the lower housing portion 418 to form an accommodating space with the plurality of desiccant particles 414 relatively fixed therein. Then, the breathable film 403 is secured to the film supporting frame 434 by an ultrasonic welding process. Next, the protective cover 302 is connected and secured on the top of the mounting seat 301 by snap-fit connection. Finally, the sealing ring 405 is mounted in the sealing ring engaging groove 705 on the mounting seat 301.

Figure 9:
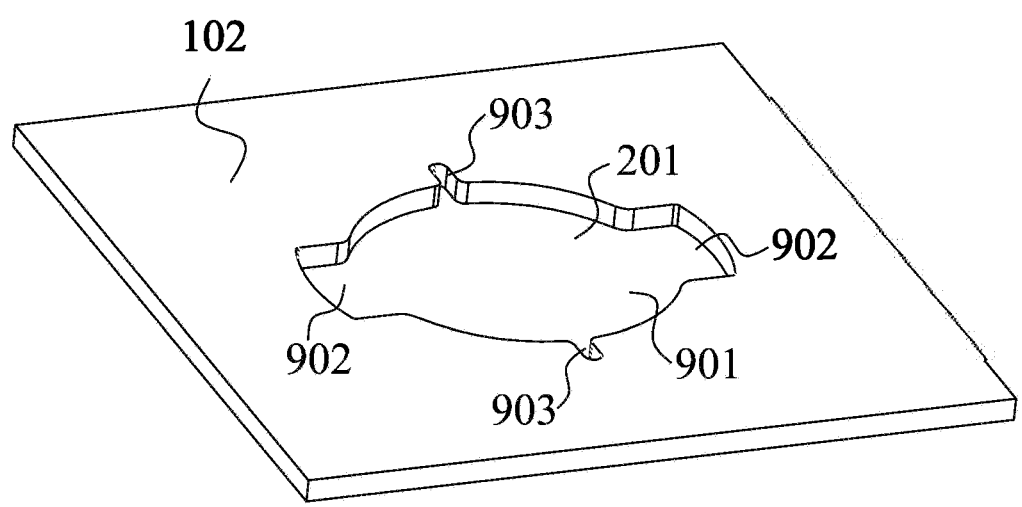
FIG. 9 is a perspective diagram of the battery pack housing in FIG. 2B at a mounting hole.

FIG. 9 is a partial perspective diagram of the battery pack housing 102 in FIG. 2A at the mounting hole 201. As shown in FIG. 9, the mounting hole 201 penetrates the top wall of the battery pack housing 102 in a thickness direction for mounting the pressure balancing device 101. The mounting hole 201 comprises a main body accommodating portion 901, two engaging and accommodating portions 902 and two notch portions 903. The main body accommodating portion 901 is circular, and the two engaging and accommodating portions 902 and the two notch portions 903 are arranged on an outer edge of the main body accommodating portion 901 and each are in communication with the main body accommodating portion 901. The two engaging and accommodating portions 902 are arranged opposite one another on the outer edge of the main body accommodating portion 901. The two notch portions 903 are arranged between the two engaging and accommodating portions 902 at an interval and are located on the two opposite sides of the outer edge of the main body accommodating portion 901. That is to say, the two engaging and accommodating portions 902 and the two notch portions 903 are arranged at intervals at four quartered positions on the outer edge of the main body accommodating portion 901. The above structural arrangement of the mounting hole 201 matches the structure of the two lugs 428 on the mounting seat 301, and is configured to realize mounting of the pressure balancing device 101 on the battery pack housing 102 by engagement. The mounting hole 201 matches the lower housing portion 418, and the size of the mounting hole 201 is the same as the cross section of the lower housing portion 418 or is slightly greater than the cross section of the lower housing portion 418. The engaging and accommodating portion 902 matches the lug 428, and the shapes and sizes of the two are generally the same. The notch portion 903 matches the elastic arm 701, and the shapes and sizes of the two are generally the same.

Figure 10A:
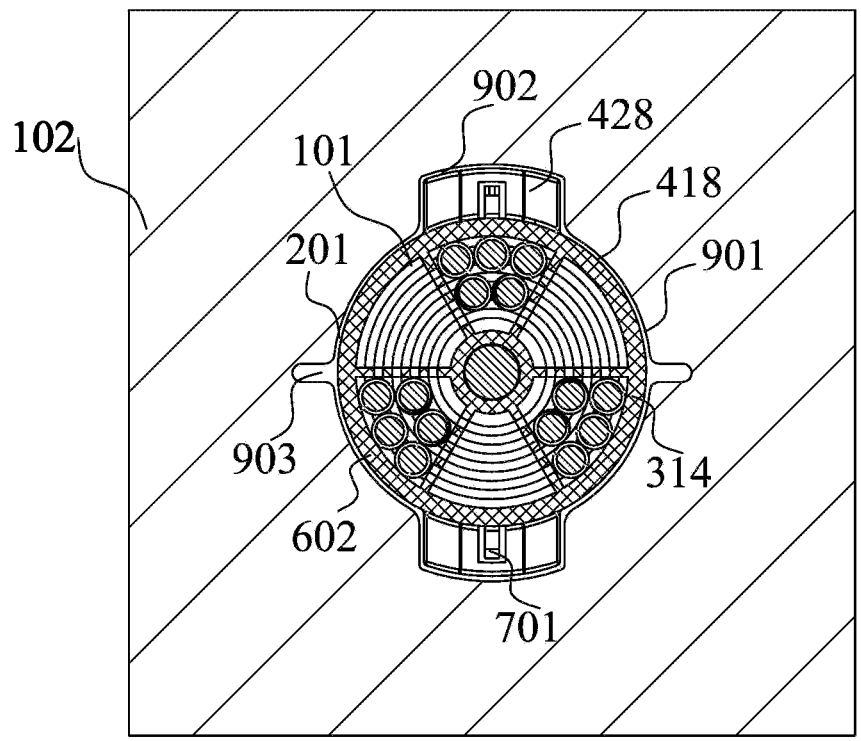
FIG. 10A to FIG. 10B are schematic diagrams of steps of mounting the pressure balancing device on the battery pack housing.
Figure 10B:
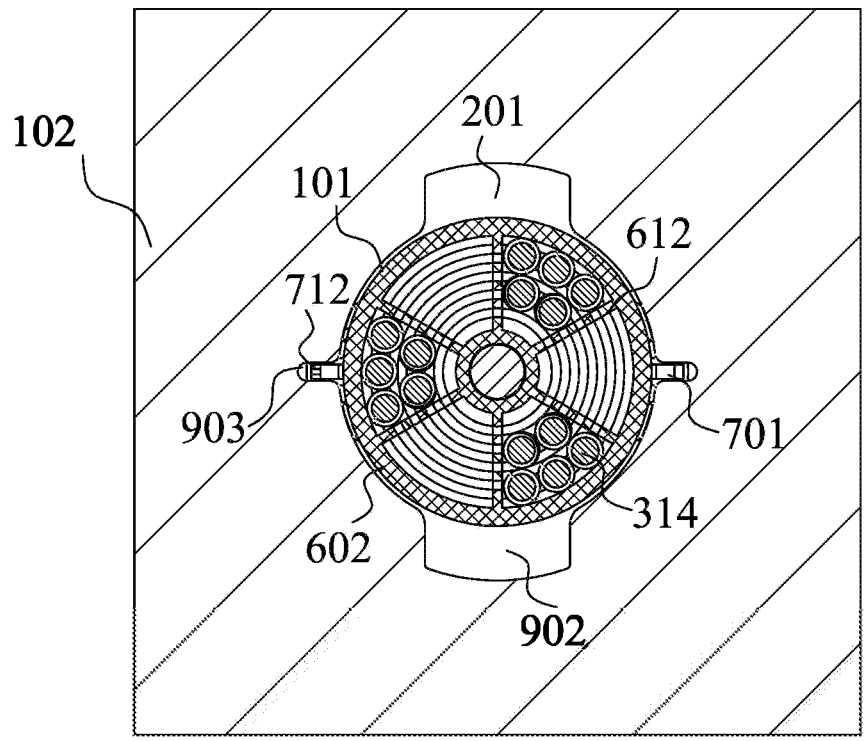

FIGS. 10A to 10B are schematic diagrams of steps of mounting the pressure balancing device 101 on the battery pack housing 102. For ease of illustration, FIGS. 10A to 10B represent the mounting and fitting relationship between the pressure balancing device 101 and the battery pack housing 102 with the pressure balancing device 101 taken along line A-A in FIG. 3 as an example. As shown in FIG. 10A, in order to mount the pressure balancing device 101 to the battery pack 100, the pressure balancing device 101 is firstly placed in such a way that one side of the lower housing portion 418 faces one side of the outer surface 202 of the battery pack housing 102, and then the two lugs 428 are positioned to be respectively aligned to the two engaging and accommodating portions 902, so as to insert the lower housing portion 418 downward into the mounting hole 201. In this case, the lower housing portion 418 falls into the main body accommodating portion 901, the two lugs 428 respectively fall into the two engaging and accommodating portions 902, while the two notch portions 903 do not accommodate any component. Subsequently, the pressure balancing device 101 continues to be pressed downward. It can be seen with respect to FIG. 2B that the two lugs 428 will reach the inner surface 203 side of the battery pack housing 102, and the mounting component 422 will abut against the outer surface 202 of the battery pack housing 102 because of its greater cross section than that of the mounting hole 201. In this case, the lower housing portion 418 located between the mounting component 422 and the lug 428 is exactly accommodated in the mounting hole 201. Then the pressure balancing device 101 is rotated by 90° (clockwise or counterclockwise as desired). During the rotation, the two elastic arms 701 on the two lugs 428 always abut against the inner surface 203 of the battery pack housing 102. After having rotated by 90°, the two elastic arms 701 are respectively located at the positions of the two notch portions 903. In this case, the free ends 712 of the two elastic arms 701 both bounce upward, and the two elastic arms 701 are at least partially accommodated in the two notch portions 903. Since the two elastic arms 701 are correspondingly engaged in the two notch portions 903, the pressure balancing device 101 and the mounting hole 201 are relatively fixed with no deflection prone to occur therebetween. In this case, the pressure balancing device 101 has been mounted on the battery pack housing 102. The matching arrangement between the elastic arm 701 and the notch portion 903 can secure the pressure balancing device 101 on the battery pack housing 102. It can be seen from FIG. 2B and FIG. 10B that the two lugs 428 after rotated by 90° respectively deviate from the positions of the two engaging and accommodating portions 902 in the mounting hole 201, and abut against the inner surface 203 of the battery pack housing 102. Since the two lugs 428 are located on the inner surface 203 of the battery pack housing 102 and the mounting component 422 is located on the outer surface 202 of the battery pack housing 102, the lugs 428 and the mounting component 422 can be cooperated to securely connect the pressure balancing device 101 to the battery pack housing 102, so as to prevent the up and down movements of the pressure balancing device 101.

Figure 11A:
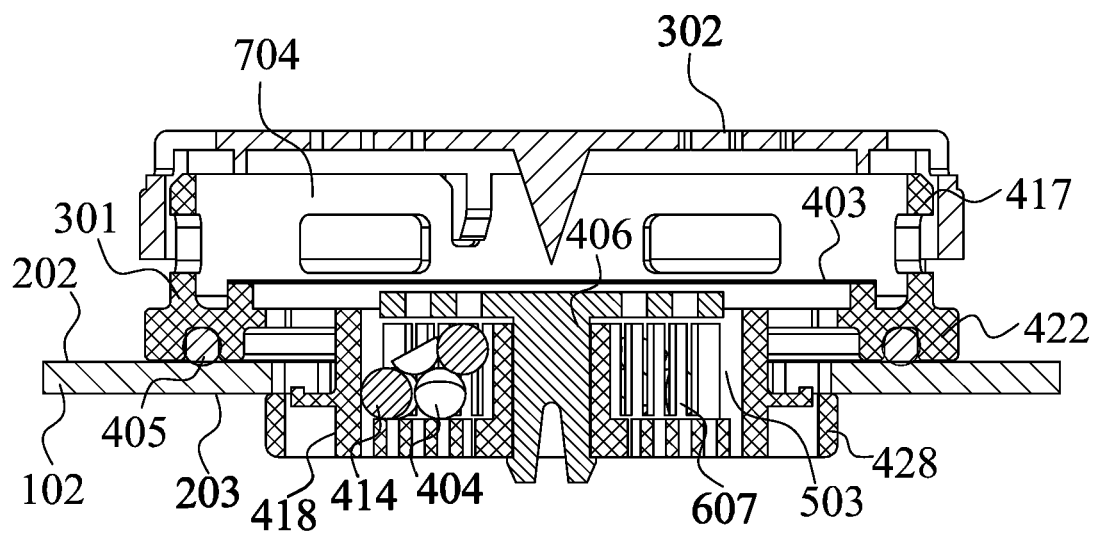
FIG. 11A and FIG. 11B are respectively longitudinal section views of the pressure balancing device mounted on the battery pack housing in FIG. 2A taken at different cutaway positions.
Figure 11B:
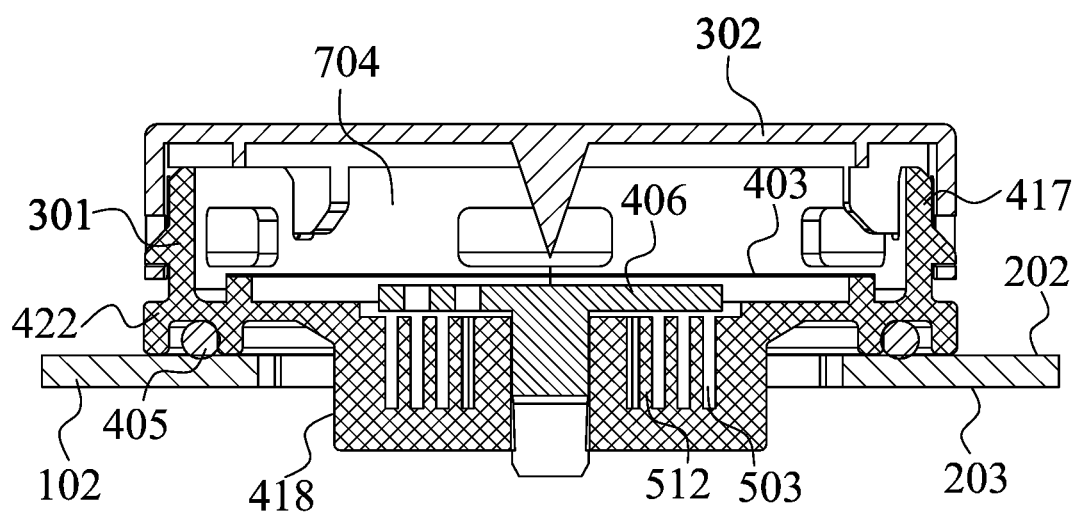

FIG. 11A and FIG. 11B are respectively longitudinal section views of the pressure balancing device 101 mounted on the battery pack housing 102 in FIG. 2A at different cutaway positions. As shown in FIGS. 11A and 11B, the pressure balancing device 101 is engaged in the mounting hole 201 in the battery pack housing 102, the upper housing portion 417 is generally located above the battery pack housing 102, and the lower housing portion 418 is generally located below the battery pack housing 102. The mounting component 422 abuts against the outer surface 202 of the battery pack housing 102, and the lugs 428 each abut against the inner surface 203 of the battery pack housing 102. Since the sealing ring 405 is mounted on the lower surface of the mounting component 422 by partial interference fit, the sealing ring 405 also tightly abuts against the outer surface 202 of the battery pack housing 102 to prevent the battery pack housing 102 from being loosened and moving between the mounting component 422 and the lugs 428 of the pressure balancing device 101, thereby assisting the mounting component 422 and the lugs 428 in securing the battery pack housing 102. Further, the arrangement of the sealing ring 405 also helps to seal between the pressure balancing device 101 and the battery pack housing 102, effectively preventing external dust particles or liquid from entering the battery pack 100 through the gap between the pressure balancing device 101 and the battery pack housing 102. In the present disclosure, the mounting component 422 and the two lugs 428 are arranged on the pressure balancing device 101, and the pressure balancing device 101 can be secured on the battery pack housing 102 by only using the matching relationship between the mounting component 422, the lugs 428 and the mounting hole 201 in the battery pack housing 102 without additional mounting parts or mounting tools, which greatly simplifies the steps of assembling the pressure balancing device 101. The pressure balancing device 101 in this embodiment comprises two lugs 428, and in other embodiments, the number of the lugs 428 may be different, such as one, three, four, and so on. Further, in order to match the number of the lugs 428, it is also necessary to provide a corresponding number of engaging and accommodating portions 902 for mounting holes 201 in the battery pack housing 102. Further, the protective cover 302, the mounting seat 301, and the cover 406 of the pressure balancing device 101 according to the present disclosure are made of plastics, that is to say, the pressure balancing device 101 is made of plastics as a whole. The material design in plastics not only reduces the weight of the pressure balancing device 101, but also simplifies the production process for the pressure balancing device 101, and thus reduces the production cost of the pressure balancing device 101.

When the gas pressure inside the battery pack 100 is lower than the air pressure of the external environment, the gases from the external environment will enter the battery pack 100 through the pressure balancing device 101. Because the breathable film can block liquid water but cannot block gaseous water, the water vapor contained in the air in the external environment will also enter the battery pack 100. In the present disclosure, since the drying component 404 is provided on the inner side of the breathable film 403 in the pressure balancing device 101, it can absorb the water vapor that enters the battery pack 100 through the breathable film 403. Further, the pressure balancing device 101 according to the present disclosure has a unique structure arrangement. Even if the drying component 404 is provided inside the pressure balancing device 101, the sufficient circulation of the gas inside the pressure balancing device 101 can also be ensured. First, in the present disclosure, the drying component 404 is configured to be in the form of a plurality of desiccant particles 414. Since a plurality of gaps may be formed between the plurality of desiccant particles 414, the plurality of desiccant particles 414 can better facilitate the circulation of gas than a bulk of the drying component. Second, in the present disclosure, the accommodating space for placing a plurality of desiccant particles 414 therein is hollowed out, for example, the support portion 601 at the bottom of the accommodating space and the top plate 415 of the cover at the top of the accommodating space each have a plurality of hollowed-out through holes. The hollowed-out structure of the accommodating space can not only accommodate the desiccant particles 414, but also facilitate the communication between the gas inside the accommodating space and the outside of the accommodating space, achieving the drying function without hindering the pressure relief function of the pressure balancing device 101. In the present disclosure, the accommodating space is further divided into a plurality of sub-regions 607, wherein desiccant particles 414 are placed in only some of the sub-regions 607 and the other sub-regions 607 are completely vacant, thereby providing sufficient flow space for gas circulation. Further, the partition plates 612 for separating the plurality of sub-regions 607 are also hollowed out to ensure the fluid communication between the plurality of sub-regions 607. It thus can be seen that disposing the drying component 404 in different regions not only enhances the circulation of gas in the desiccant accommodating space, but also enhances the fluid circulation between the inside and outside of the accommodating space.

When battery cells inside the battery pack 100 are operating, the temperature of the battery pack 100 will rise, causing the internal gas pressure to increase. When the hot gas is slowly released to the external environment through the pressure balancing device 101, the flow of the hot gas in the battery pack 100 also causes the moisture otherwise would be absorbed in the desiccant particles 414 to be discharged to the external environment, thereby realizing the self-drying of the desiccant particles 414. That is to say, disposing the drying component 404 inside the breathable film 403 of the pressure balancing device 101 can not only reduce the gas humidity inside the battery pack 100, but also allow the drying component 404 to be reused.

Although the present disclosure will be described with reference to the specific embodiments shown in the accompanying drawings, it should be understood that many variations may be made to the structure of the pressure balancing device 101 according to the present disclosure without departing from the spirit, scope and background of the teachings of the present disclosure. Those of ordinary skill in the art would also have appreciated that there are different ways to alter the structural details in the embodiments disclosed in the present disclosure, which all fall within the spirit and scope of the present disclosure and the claims.

The invention claimed is:

1. A pressure balancing device, comprising:
 a mounting seat comprising:
  a mounting seat housing, wherein a fluid channel is formed in the mounting seat housing, and the fluid channel is capable of fluidly communicating an interior space of a component to be depressurized with an external environment; and
  a support portion disposed in the fluid channel, wherein the support portion is connected to the mounting seat housing;
 a breathable film covering on the fluid channel; and
 a drying component disposed on the support portion and located between the support portion and the breathable film, wherein the drying component is configured to absorb moisture entering the fluid channel.

2. The pressure balancing device of claim 1, wherein the support portion is disposed transversely to the fluid channel, and a plurality of hollowed-out support portion channels are disposed on the support portion, so that a gas can flow through the plurality of hollowed-out support portion channels.

3. The pressure balancing device of claim 2, wherein the drying component comprises a plurality of desiccant particles disposed on the support portion; and
the plurality of hollowed-out support portion channels are sized such that the plurality of desiccant particles cannot pass through the plurality of hollowed-out support portion channels.

4. The pressure balancing device of claim 3, wherein the mounting seat further comprises a partition forming at least two sub-regions in the fluid channel between the support portion and the breathable film, and the plurality of desiccant particles are disposed in a part of the plurality of sub-regions.

5. The pressure balancing device of claim 4, wherein the partition is provided with a plurality of hollowed-out partition channels, and the plurality of hollowed-out partition channels enable the plurality of sub-regions to be in fluid communication.

6. The pressure balancing device of claim 5, wherein the partition comprises a central column and a plurality of partition plates, the plurality of partition plates are disposed around the central column, and each partition plate of the plurality of partition plates is provided with a plurality of hollowed-out partition channels.

7. The pressure balancing device of claim 4, wherein the pressure balancing device further comprises a cover having a top plate overlying the partition, and the top plate is configured to cover the part of the plurality of sub-regions containing the plurality of desiccant particles to retain the plurality of desiccant particles within the part of the plurality of sub-regions; and
the top plate is provided with a plurality of hollowed-out top plate channels, and the plurality of hollowed-out top plate channels are sized such that the plurality of desiccant particles cannot pass through the plurality of hollowed-out top plate channels.

8. The pressure balancing device of claim 7, wherein the cover further comprises a mounting insert, wherein one end of the mounting insert is connected to the top plate, a distal end of the mounting insert is provided with a snap-on structure, the support portion is provided with a support portion mounting hole, and the snap-on structure is engaged in the support portion mounting hole.

9. The pressure balancing device of claim 3, wherein the plurality of desiccant particles are made of silica gel desiccant, alumina gel desiccant, or molecular sieve desiccant.

10. The pressure balancing device of claim 1, wherein the mounting seat housing further comprises a cavity with an opening, the breathable film is located between the cavity and the fluid channel, and the fluid channel is in fluid communication with the external environment through the cavity.

* * * * *